(12) United States Patent
Tseng et al.

(10) Patent No.: US 11,797,111 B2
(45) Date of Patent: Oct. 24, 2023

(54) ACTIVE STYLUS ADAPTIVE TO MULTIPLE INPUT TYPES AT AN INFORMATION HANDLING SYSTEM

(71) Applicant: Dell Products L.P., Round Rock, TX (US)

(72) Inventors: Kuo-Wei Tseng, Zhongzheng Dist (TW); How-Lan Eric Lin, Taipei (TW); Yu-Chen Liu, Hsinchu (TW); Chi-Fong Lee, Taoyuan (TW); Wei-Chou Chen, Lingya District (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/217,158

(22) Filed: Mar. 30, 2021

(65) Prior Publication Data

US 2022/0317784 A1 Oct. 6, 2022

(51) Int. Cl.
*G06F 3/038* (2013.01)
*G06F 3/041* (2006.01)
*G06F 3/0354* (2013.01)
*G06F 3/044* (2006.01)

(52) U.S. Cl.
CPC ........ *G06F 3/0383* (2013.01); *G06F 3/03545* (2013.01); *G06F 3/0441* (2019.05); *G06F 3/0442* (2019.05); *G06F 3/04162* (2019.05); *G06F 3/0446* (2019.05); *G06F 2203/0382* (2013.01); *G06F 2203/0384* (2013.01)

(58) Field of Classification Search
CPC ............................ G06F 3/0383; G06F 3/0441
See application file for complete search history.

(56) References Cited

U.S. PATENT DOCUMENTS

| 9,448,670 | B2 | 9/2016 | Walley | |
|---|---|---|---|---|
| 9,606,641 | B2 | 3/2017 | Holsen | |
| 9,619,051 | B2 | 4/2017 | Ryshtun et al. | |
| 9,658,720 | B2 | 5/2017 | Kremin et al. | |
| 9,785,262 | B2 | 10/2017 | Fleck et al. | |
| 2012/0105361 | A1* | 5/2012 | Kremin | G06F 3/04162 345/174 |
| 2013/0278550 | A1* | 10/2013 | Westhues | G06F 3/0446 345/173 |
| 2014/0049478 | A1* | 2/2014 | Brunet | G06F 3/0442 345/173 |
| 2014/0184554 | A1* | 7/2014 | Walley | G06F 3/0441 345/174 |
| 2016/0266663 | A1* | 9/2016 | Holsen | G06F 1/3259 |
| 2016/0306447 | A1* | 10/2016 | Fleck | G06F 3/044 |

(Continued)

*Primary Examiner* — Chun-Nan Lin
(74) *Attorney, Agent, or Firm* — ZAGORIN CAVE LLP; Robert W. Holland

(57) ABSTRACT

An information handling system stylus transmits a wireless signal at a writing tip to enhance touch detection of the writing tip by a touchscreen display and receives wireless signals from the touchscreen display at a receiving antenna. To enhance control of wireless energy distributed at the writing tip, the receiving antenna is selectively coupled to the writing tip, such as by transitioning from a float of the receiving antenna to an interface with the stylus power source at transmit by the writing tip. Charge at the receiving antenna helps to shape the energy distribution from the writing tip, such as to match the energy distribution of other styluses in use at the touchscreen display.

9 Claims, 4 Drawing Sheets

(56) References Cited

U.S. PATENT DOCUMENTS

| | | | |
|---|---|---|---|
| 2018/0338065 A1* | 11/2018 | Zyskind | G06F 3/0442 |
| 2019/0004649 A1* | 1/2019 | Ju | G06F 3/0412 |
| 2019/0196642 A1* | 6/2019 | Kong | G06F 3/041662 |
| 2021/0109609 A1* | 4/2021 | Holsen | G06F 3/04162 |

* cited by examiner

ACTIVE STYLUS ADAPTIVE TO MULTIPLE INPUT TYPES AT AN INFORMATION HANDLING SYSTEM

BACKGROUND OF THE INVENTION

Field of the Invention

The present invention relates in general to the field of information handling system stylus input devices, and more particularly to an active stylus adaptive to multiple input types at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. In some cases, convertible systems rotate to a tablet position that folds the main housing portion under the lid housing portion to expose a touchscreen display that accepts touch inputs. More recently, convertible systems have come to market that replace the keyboard with a second touchscreen display to offer a virtual keyboard in the clamshell position and a larger display surface in a tablet position having the housing rotated 180 degrees to a planar orientation. After usage, convertible information handling systems rotate the lid housing portion over the main housing portion to protect the keyboard and display, thus reducing the system footprint for improved storage and mobility.

Touchscreen displays offer a convenient input surface that allows a user to touch the display to select an icon, similar to clicking with a mouse. As touchscreen display resolution has improved, both in presentation of visual images and in touch accuracy, a stylus has become a popular touch input device. A conventional passive stylus has a tip that provides a more precise touch point than an end user finger to support graphical drawing inputs. More recently, active styluses have come to market that provide even greater accuracy of touch inputs by actively communicating between the writing tip of the stylus and a digitizer integrated in the display. Wireless signals communicated between the active tip and digitizer wirelines allow a more precise determination of the tip position. The digitizer transmits a script with parameters for the stylus to use when transmitting from the tip and then the digitizer wirelines receive the stylus transmission to locate the tip position. A receiver antenna in the stylus receives transmissions from the digitizer to allow the digitizer to communicate with an ASIC or other controller that manages the tip transmissions. The receiver antenna is typically a base of the stylus from which the tip extends that floats as antenna insulated from the tip and stylus ground.

Initially active stylus devices tended to have vendor specific protocols to support communication. For example, vendor specific protocols use sensor grids in the display to detect an electric field associated with a stylus transmission and vendor specific wireless signals. More recently, the Universal Stylus Initiative (USI) has introduced a standard designed to provide active stylus interoperability across devices of different manufacturers. One difficulty that arises when different types of stylus devices are used at a touchscreen is that the writing tip configuration can impact the energy emitting curve directed towards the touchscreen device. Other factors that impact how tip energy scatters at the touchscreen display surface include the tip material dielectric constant, the tip transmit voltage and the tip transmit frequency. As a result, a touch controller interfaced with the digitizer of the touchscreen display has difficulty supporting multiple styluses simultaneously. Typically, firmware and a configuration table in the touch controller provides high accuracy for a single stylus by knowing the type of signal transmitted, however, minor differences of the writing tip energy scattering characteristics between different stylus vendors introduces inaccuracies that vary with the type of scattering curve output at each type of writing tip. Although some styluses support a dynamic transmit power to achieve a desired peak energy curve, such adjustments do not address the scattering differences of different types of transmitted signals.

SUMMARY OF THE INVENTION

Therefore, a need has arisen for a system and method which adapt a stylus writing tip transmit energy distribution at a touchscreen display.

In accordance with the present invention, a system and method are provided which substantially reduce the disadvantages and problems associated with previous methods and systems for transmitting from an active stylus writing tip. A stylus writing tip wireless signal energy distribution is adjusted by selectively floating and energy coupling a receiving antenna of the stylus. For example, the receiving antenna floats when in a receive mode to receive transmission from a touchscreen display and energy couples with the stylus power system during wireless signal transmits by the writing tip, such as with a direct current voltage, alternating current voltage and/or ground.

More specifically, an information handling system processes information with a processor and memory disposed in a housing and presents the information as visual images at a touchscreen display. Touches at the touchscreen display by an active stylus are detected by a touch controller and presented as stylus write inputs by a GPU at the touchscreen display based upon a position determined by the touch controller. The stylus writes to the touchscreen display by transmitting a wireless signal from the stylus writing tip and receives wireless signals transmitted by the touchscreen display at a receiving antenna integrated in the stylus proximate the writing tip. In a receive mode, the receiving antenna floats relative to the stylus power system to receive wireless signals transmitted by the touch controller through a touch grid or other touch detection system, which are interpreted by a receiver of a processing resource in the stylus. In a transmit mode, the receiving antenna selectively couples with the stylus power system to adjust the energy distribution of the wireless signal transmitted by the writing tip through energy coupling of the writing tip and receiving antenna. For example, an alternating current voltage is applied or generated at the receiving antenna so that capacitive coupling between the writing tip and receiving antenna adjusts energy distribution by the writing tip at the touchscreen display in a desired manner. In various embodiments, one or more of a DC voltage, AC voltage and ground may be applied by an interface with the stylus power system. In one example embodiment, when plural styluses interact with a shared touchscreen display, one or more of the styluses applies energy coupling with the receiving antenna during writing tip wireless transmissions so that the styluses have a substantially matching energy distribution.

The present invention provides a number of important technical advantages. One example of an important technical advantage is that an active stylus wireless signal transmission energy distribution is adjusted at a touchscreen display to provide enhanced touch detection accuracy. In situations where two styluses are used at a touchscreen display that have different vendors and/or different write transmission energy distributions, one or both of the styluses may adjust its writing tip energy distribution to match the other or to match a universal energy distribution so that the touchscreen display detects touches in a similar manner. Having a universal or otherwise similar energy distribution related to capacitive energy coupling between the writing tip and receiving antenna allows a single type of active stylus touch controller firmware to accurately determine the position of both styluses. In a single stylus use scenario, a touch controller provides enhanced touch accuracy by commanding a desired writing tip energy distribution that matches touch detection supported by the touch controller firmware.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system stylus performs touch inputs at a touchscreen display with a writing tip having the energy distribution of transmitted wireless signals managed by selective float and power source interface by a receiving antenna disposed proximate the writing tip. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
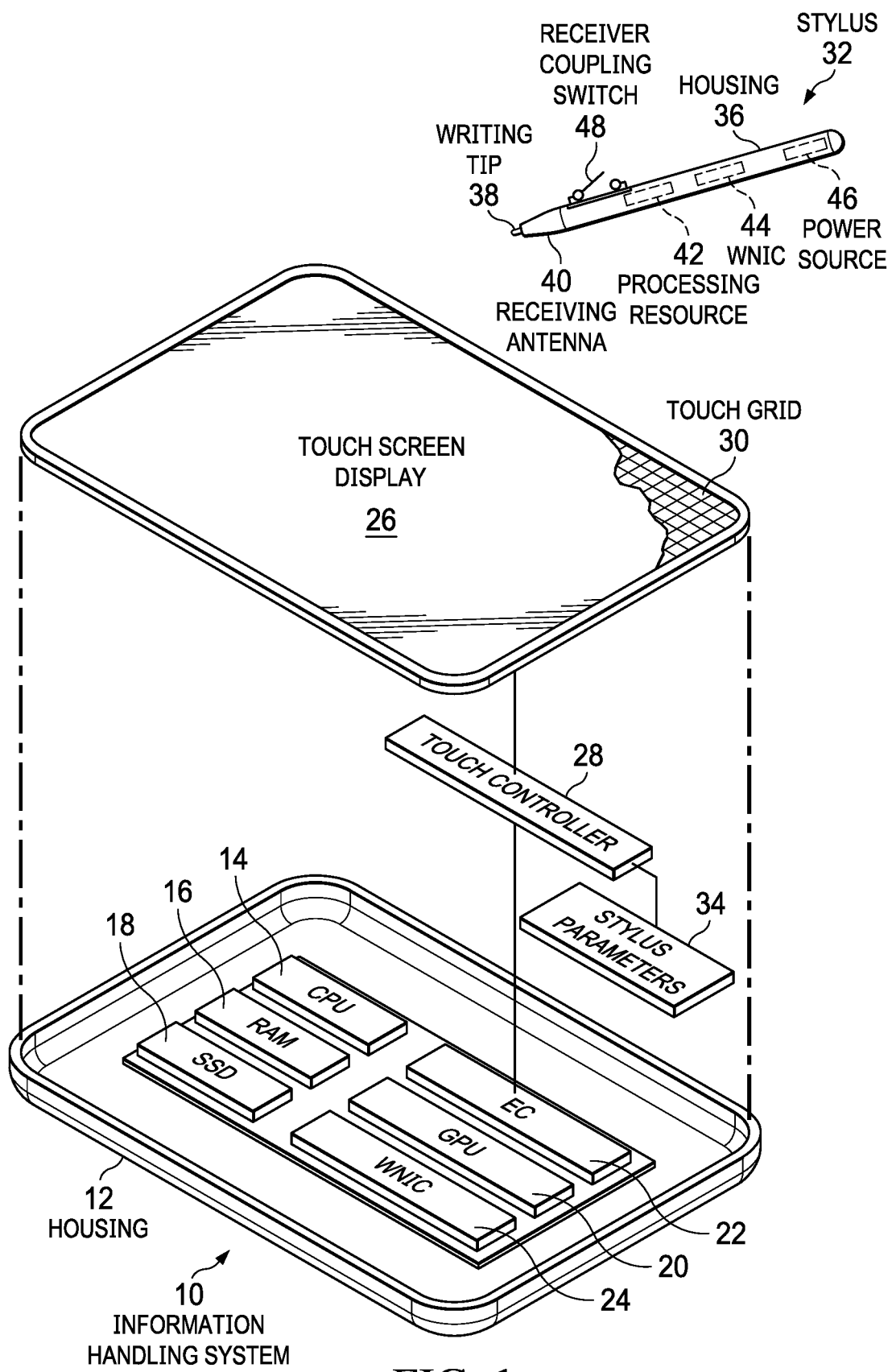
FIG. 1 depicts an upper perspective exploded view of an information handling system having a stylus that makes touch inputs at a touchscreen display with a directionally controlled energy distribution from an active writing tip.

Referring now to FIG. 1, an upper perspective exploded view depicts an information handling system 10 having a stylus 32 that makes touch inputs at a touchscreen display 26 with a directionally controlled energy distribution from an active writing tip 38. Information handling system 10 processes information with processing components disposed in a housing 12. In the example embodiment, a central processing unit (CPU) 14 executes instructions that process information and interfaces with a random access memory (RAM) 16 that stores the instructions and information. A solid state drive (SSD) 18 provides persistent storage of information, such as applications and an operating system that execute on CPU 14. A graphics processing unit (GPU) 20 interfaces with CPU 14 to further process information and defined visual images for presentation at a touchscreen display 26, such as with pixel values that define colors for presentation by pixels of touchscreen display 26. An embedded controller 22 manages physical operations of the system, such as power and thermal constraints, as well as coordinating communication of inputs from input devices to CPU 14, such as keyboard, mouse and touch inputs. A wireless network interface card (WNIC) 24 supports wireless interfaces with external devices, such as through WiFi and/or BLUETOOTH. A touchscreen display 26 interfaces with GPU 20 and embedded controller 22 to present visual images and accept touches as inputs. In the example block diagram, touchscreen display 26 is shown integrated with housing 12 as a tablet configuration, however, in alternative embodiments, touchscreen display 26 may interface as a peripheral device separate from housing 12.

In operation, touchscreen display 26 presents visual images defined by GPU 20, such as by generating at each of plural pixels a color defined by pixel values scanned from GPU 20. For example, touchscreen display 26 might generate visual images with a liquid crystal display (LCD) panel or an organic light emitting diode (OLED) display panel. A touch grid 30 disposed at the upper surface of touchscreen display 26 interfaces with a touch controller 28 to detect touch positions at touchscreen display 26 that are reported to embedded controller 22 as touch inputs. For example, touch grid 30 is energized with an electrostatic charge so that a conductive member brought in proximity is sensed through capacitive coupling at touch grid 30 as measured by touch controller 28. In alternative embodiments, other types of touch detection devices may be integrated with the display to detect touches. Touch controller 28 determines touch positions by digitizing the position of the capacitive coupling with the crossed locations of touch grid 30. A stylus 32 provides touch inputs that are more precisely located based upon the smaller size (relative to a finger) of a writing tip 38 that comes into proximity with or touches touchscreen display 26. In the example embodiment, stylus 32 has an active writing tip that enhances capacitive touch. For example, an MCU, a system on chip, ASIC and/or other types of processing resource 42 generates a wireless signal that transmits from writing tip 38 to enhance its capacitance for sensing by touch grid 30 and touch controller 28. Essentially, writing tip 38 is a transmitting antenna that transmits a wireless signal, such as from an alternating current signal electrical field that provides enhanced capacitive coupling with touch grid 30 through near field effects.

Stylus 32 has a pen-shaped housing 36 to hold writing tip 38 at a writing position. Housing 36 includes processing resource 42, a WNIC to support wireless communications and an internal power source 46, such as a battery and power supply. Processing resource 42 provides the wireless signal for transmission from writing tip 38. For example, an MCU may provide a command to an ASIC that transmits one or more type of signal and receives signals from a receiving antenna 40. At the end of housing 36 proximate writing tip 38 a receiving antenna 40 is incorporated to receive wireless signals transmitted from touchscreen display 26, such as a conductive material disposed around the writing tip. In operation, touch controller 28 may transmit configuration parameters and other operating conditions from touch grid 30 to receiving antenna 40 with a wireless signal that is interpreted by processing resource 42, such as through near field effects of capacitive coupling. For instance, various types of active stylus devices may improve the precision of touch detection of writing tip 38 by applying a wireless signal according to stylus parameters 34 that are exchanged through receiving antenna 40 or, alternatively, through WNIC 44 by BLUETOOTH. During writing at touchscreen display 26, touch grid 30 and writing tip 38 may alternate transmitting wireless signals and receiving wireless signals to help locate touches with improved precision. During the receiving of wireless signals from touch grid 30, receiving antenna 40 floats relative to power system 46 of stylus 32 so that transmitted wireless signals are picked up and readable by processing resource 42. In the example embodiment, a receiver coupling switch 48 selectively floats receiving antenna 40 and couples receiving antenna 40 to the power system 46 of stylus 32 as is explained in greater depth below. For example, power system 46 may interface with receiving antenna 40 by applying a direct current voltage (DCV) of positive or negative value, an alternating current voltage (ACV), a combination of a DCV and ACV, or ground. Capacitive coupling between writing tip 38 and receiving antenna 30 when receiver coupling switch 48 closes helps to manage the direction of wireless signals transmitted by writing tip 38.

Figure 2C:
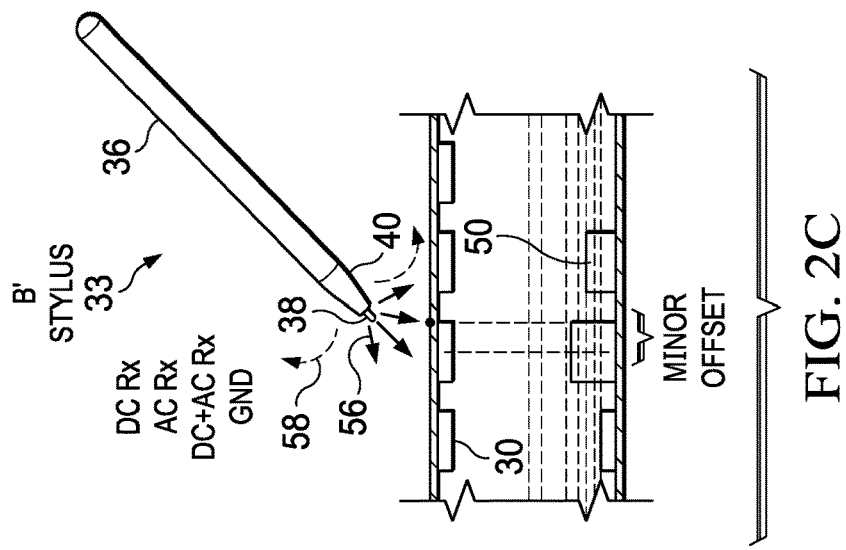
FIGS. 2A, 2B, and 2C depict a side cutaway view of examples of stylus touch interactions with a touchscreen display and having wireless signal energy distribution adjusted for enhanced touch detection accuracy.
Figure 2B:
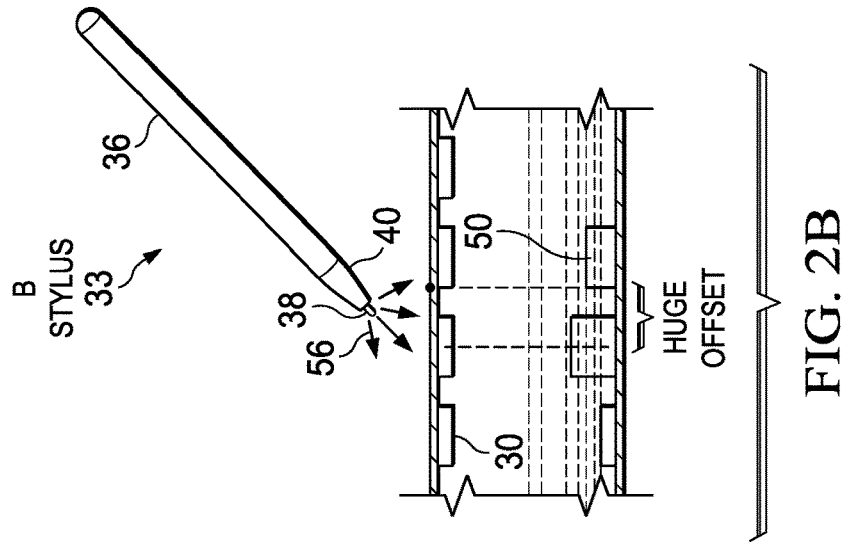
Figure 2A:
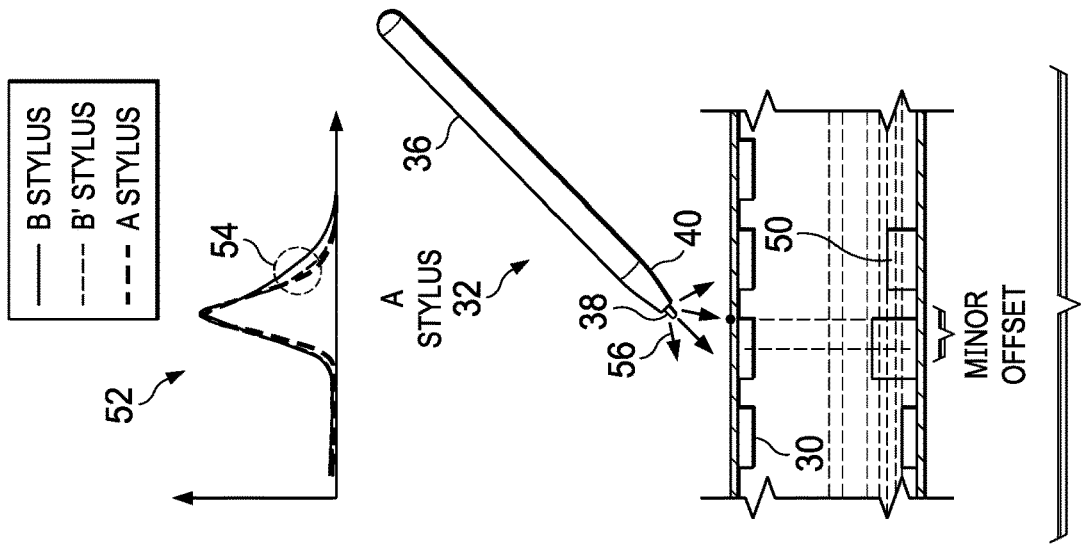

Referring now to FIGS. 2A, 2B, and 2C, side cutaway views depict examples of stylus touch interactions with a touchscreen display and having wireless signal energy distribution adjusted for enhanced touch detection accuracy. In situations where multiple stylus devices interact at a touchscreen display, varied energy distributions of the wireless signal transmitted by different writing tips can impact the accuracy of touchscreen touch detection. By substantially matching the energy distribution transmitted at each writing tip, the same stylus parameters may be used for all writing tips to enhance accuracy. In the example embodiment of FIG. 2A, "A" stylus 32 provides a reference energy distribution that is used by the touch controller to determine a precise touch position relative to the touch grid 30. Lines 56 illustrate how energy is distributed at touch grid 30, which can apply an expected energy distribution to determine a position of writing tip 30 based upon the detected energy. Graph 52 illustrates an example of an expected energy distribution for A stylus. Bars 50 below touch grid 30 depict the amount of energy detected at each touch grid portion based on the writing tip position. In FIG. 2B, "B" stylus 33 illustrates an example of a different type of stylus interacting with the touchscreen display. In the example, B stylus has a longer writing tip and a different material that provide a different energy distribution that A stylus, as is shown by graph 52 and bars 50. The B stylus transmits wireless energy from writing tip 38 with receiver antenna 40 configured to float relative to the stylus power source, meaning power and ground. Due to the different operating conditions of the A and B stylus, such as the different transmit frequencies and power and different writing tip shapes and materials, a touchscreen display applying the stylus A parameters will have an offset for the detected position of a stylus B relative to the actual position.

In the example embodiment of FIG. 2C, "B" stylus 33 is stylus B with receiving antenna 40 coupled through the stylus power system to enable capacitive coupling between writing tip 38 and receiving antenna 40. In the example embodiment, receiving antenna 40 is interfaced to 0 VDC or a −1 VDC bias or ground that creates a coupling energy 58 to tighten the energy distribution of writing tip 38 as shown by lines 56. Generally, when applying ground to the receiving antenna provides acceptable energy distribution, it will reduce power consumption relative to application of positive and negative DC voltage so that a calibration process may first test this lower power consumption configuration before applying current. In alternative embodiments an interface with ground may be used in addition to or in place of the 0 VDC or −1 VDC bias or ground. Coupling between writing tip 38, the transmit antenna, and receiving antenna 40 reduces the offset of the writing tip location detected at touch grid 30 and the actual position of the writing tip. As shown by graph 52, the tail area 54 for stylus B' more closely tracks that of stylus A than that of stylus B. By correcting the energy distribution of stylus B to mimic that of stylus A, the touch controller is able to more precisely track both styluses when used simultaneously. Storing in the stylus parameters the type of power coupling that will provide a similar energy distribution allows the touch controller to adjust the stylus response through wireless communications at the touch grid or by BLUETOOTH. In one example embodiment, an application running on the CPU may manage the selection of stylus energy distribution parameters, such as an operating system driver for the touchscreen display or the styluses.

Figure 3:
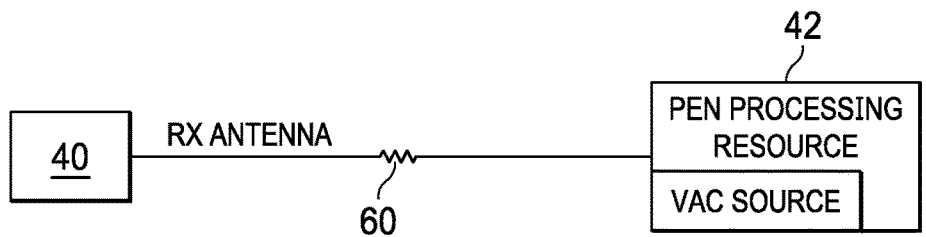
FIG. 3 depicts a block diagram of an example embodiment of a stylus that selectively floats a receiving antenna and interfaces the receiving antenna with the stylus power system.

Referring now to FIG. 3, a block diagram depicts an example embodiment of a stylus that selectively floats a receiving antenna and interfaces the receiving antenna with the stylus power system. In the example embodiment, receiving antenna 40 interfaces through a resistor 60 with a receive pin of processing resource 42 that provides the wireless signal to an integrated wireless signal receiver component. An internal alternating current voltage (VAC) source 61 of processing resource 42 selectively applies an alternating current voltage to receiving antenna 40 when the writing tip transmits a wireless signal and floats the receiving antenna when receiving wireless signals from the touch grid. In various embodiments, the voltage, frequency and phase of the alternating voltage current may be varied to achieve a desired energy distribution at the writing tip. In addition, the signal that the writing tip transmits may be adjusted to further adapt the energy distribution, such as the voltage, frequency and phase of a current applied to transmit the wireless signal from the writing tip. A calibration process may be used to achieve the stylus parameters, such as by touching a location indicated on the touchscreen display with the writing tip and then adjusting the alternating current voltage and writing tip voltage to match a desired response, such as the response of a stylus manufactured by a different stylus vendor. The calibrated stylus parameter may then be saved at the stylus and/or information handling system for reference when the different stylus devices are used simultaneously.

Figure 4:
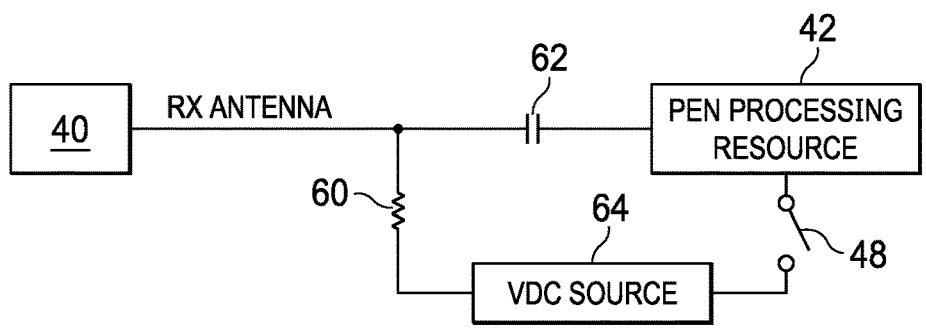
FIG. 4 depicts a block diagram of another example embodiment of a stylus that selectively floats a receiving antenna and interfaces the receiving antenna with the stylus power system.

Referring now to FIG. 4, a block diagram depicts another example embodiment of a stylus that selectively floats a receiving antenna and interfaces the receiving antenna with the stylus power system. In the example embodiment, a capacitor 62 is disposed between the receiving antenna 40 and processing resource 42 that does not impact the float of the receiving antenna when used to receive wireless signals. A direct current voltage source 64 passes through a resistor 60 to interface between receiving antenna 40 and capacitor 62 to generate an alternating current voltage when the writing tip transmits wireless signals. In the example embodiment, an external receiver coupling switch 48 selectively interfaces the direct current voltage and floats receiving antenna 40, although alternative embodiments may integrate a variable direct current voltage and float switch within processing resource 42. In the example embodiment, the direct current voltage may be variably set in the range of 3 VDC to −3 VDC, although other ranges of direct current voltages may be used. As describe above, different settings may be calibrated and stored to achieve the desired energy coupling for achieving a desired writing tip transmission energy distribution.

Figure 5A:
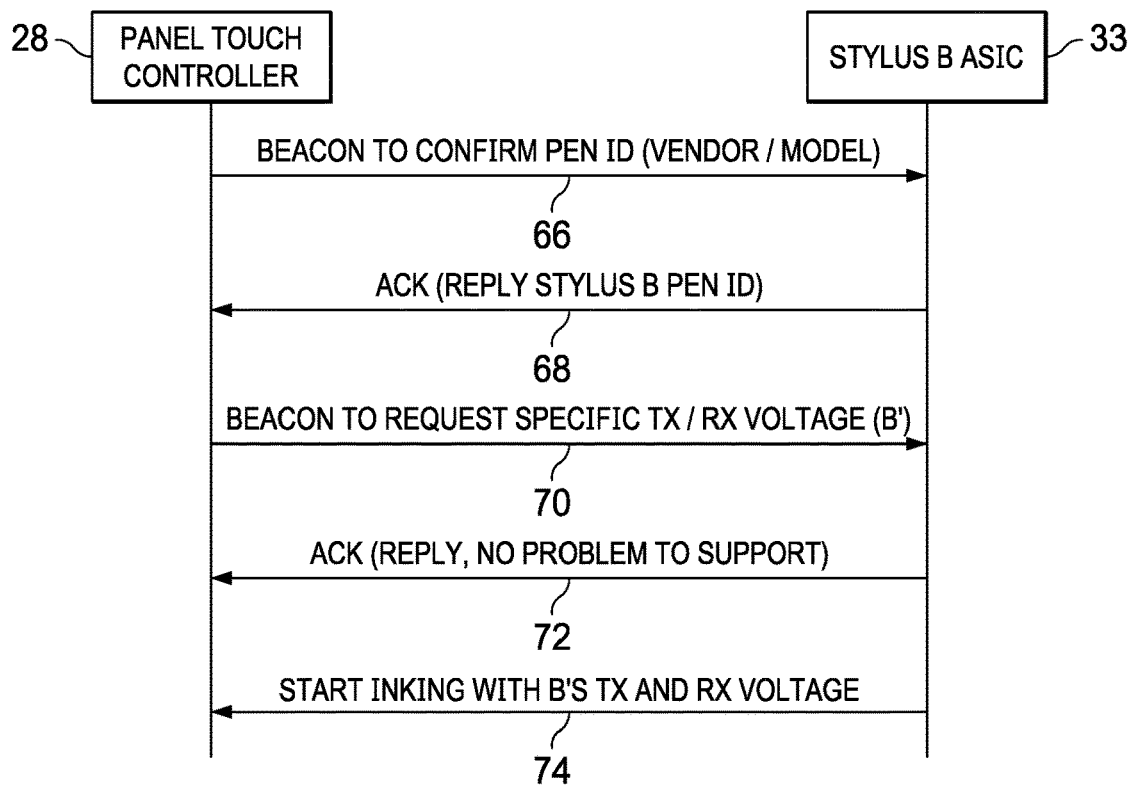
FIGS. 5A and 5B depict a flow diagram of a process for coupling a universal stylus writing tip energy distribution where plural styluses interact with a touchscreen display.
Figure 5B:
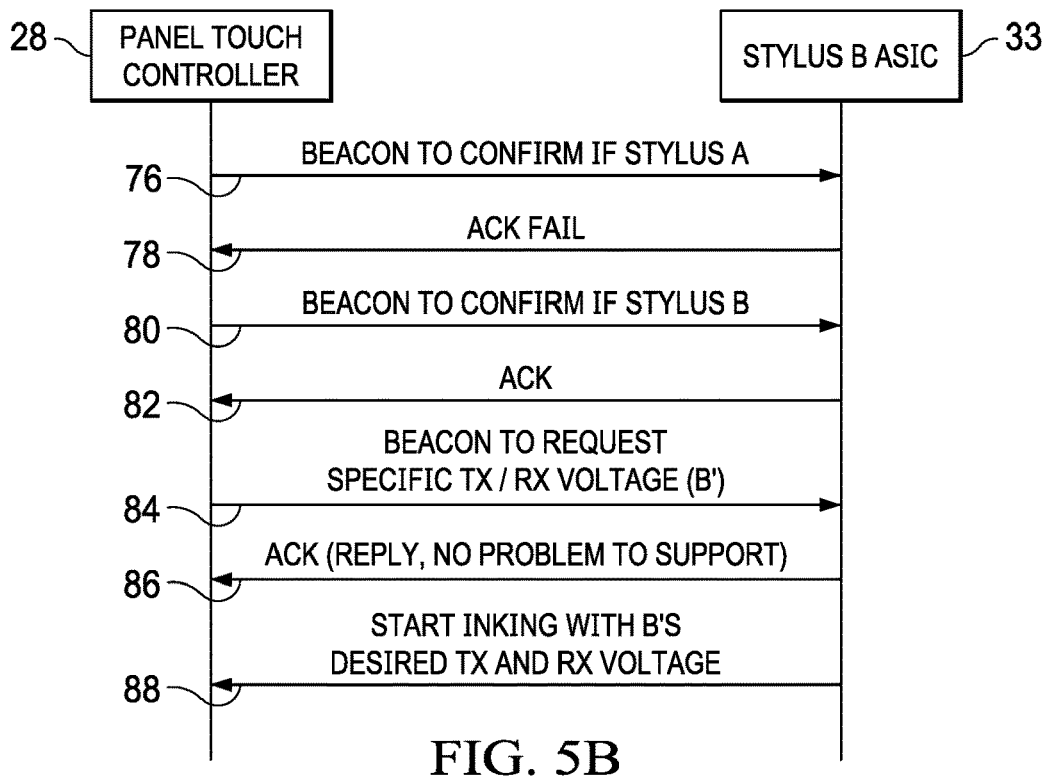

Referring now to FIGS. 5A and 5B, a flow diagram depicts a process for coupling a universal stylus writing tip energy distribution where plural styluses interact with a touchscreen display. The process starts at step 66 of FIG. 5A with the touch controller 28 transmitting a beacon to confirm the identifier of B stylus 33. At step 68 B stylus 33 transmits an acknowledgement of the stylus identifier. At step 70, touch controller 28 transmits a beacon with a request for a specific transmit and receive voltage, such as to achieve a "universal" stylus energy distribution. At step 72 B stylus 33 transmits an affirmative response to the stylus parameter request. At step 74, B stylus initiates touches with the wireless signal transmitted using the B' stylus parameters. At step 76 of FIG. 5B, touch controller 28 transmits a beacon to confirm that A stylus 32 is interfaced with the touchscreen. At step 78 the confirmation of A stylus fails. At step 80, touch controller 28 transmits a beacon to confirm if B stylus 33 is interfaced at the touchscreen display. At step 82, B stylus 33 transmits an acknowledgement of its identifier. At step 84, touch controller 28 transmits a beacon to request a stylus parameter for the B' stylus. At step 86, B stylus 33 acknowledges the request for B' stylus parameters and adjusts the receiving antenna energy coupling. At step 88 B' stylus writing tip transmissions are applied to touches at the touchscreen.

Figure 6:
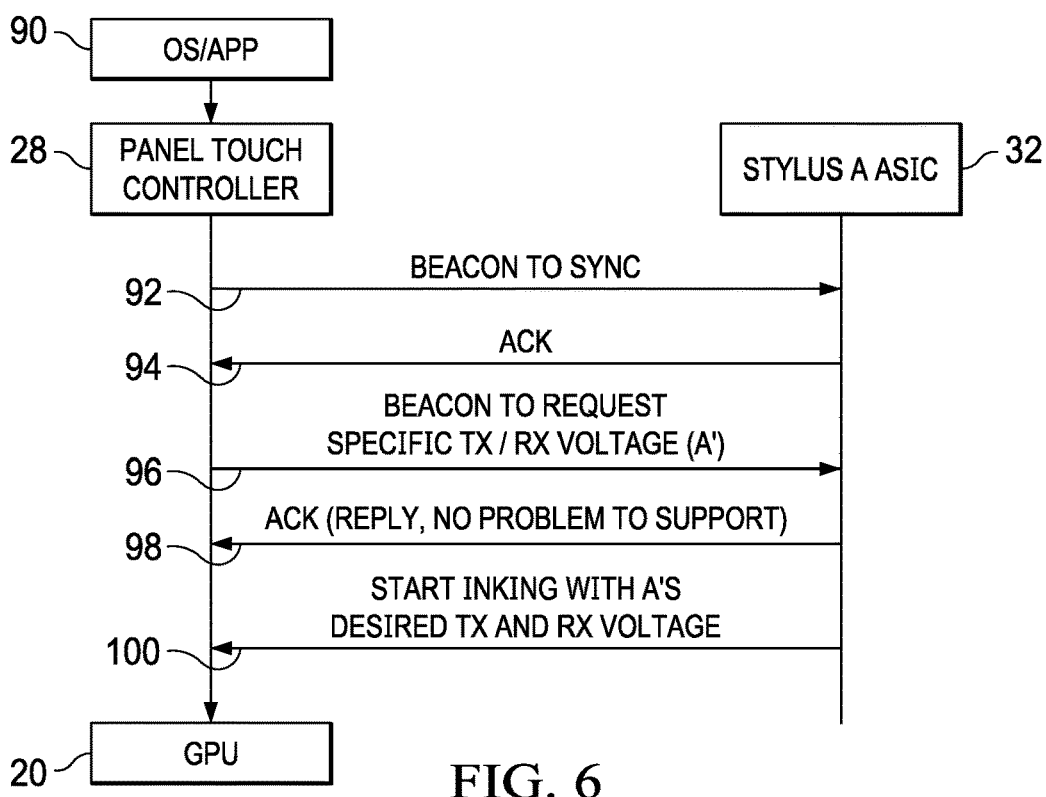
FIG. 6 depicts a flow diagram of a process for configuration of a stylus to employ a creator mode having enhanced touch accuracy.

Referring now to FIG. 6, a flow diagram depicts a process for configuration of a stylus to employ a creator mode having enhanced touch accuracy. The process starts at an end user request through operating system (or an application) 90 to use a stylus creator mode having an enhanced touch accuracy. Operating system 90 commands touch controller 28 to initiate the creator mode. At step 92, touch controller 28 sends a beacon to synchronize A stylus 32. At step 94, A stylus 32 acknowledges the beacon. At step 96, touch controller 28 sends a beacon to request the stylus parameters specific to A' stylus transmission energy distribution. At step 98, A stylus 32 acknowledges the request and adjusts the stylus transmit parameters to write with the adjusted transmit energy distribution. At step 100 A' stylus write parameters are applied to transmit at the touchscreen display, thereby activating the creator mode with more precise touch detection. GPU 20 then presents stylus inputs based upon the enhanced touch position detection parameters to create better inking accuracy.

Generally, whether to match stylus write transmissions by different stylus vendors or to adjust a stylus for more precise touch input detections in single stylus input scenarios, a variety of conditions may be adjusted as desired for an improved end user experience. Stylus write parameters may be adjusted on the fly with different types of interfaces, including through the stylus receive and transmit at the touchscreen display, through BLUETOOTH, through WiFi and through network interfaces with a network location that makes stylus parameters available for use. Stylus write precision may be adjusted with a calibration process that adjusts the stylus protocol, through artificial intelligence that tracks the accuracy of inputs over time, with machine learning or deep learning available at a network location. Specific stylus transmission energy distributions may be further refined by including additional transmission and receiver resources and different configurations of conductive and nonconductive material in the stylus body. For instance, the receive antenna may have separate portions that are each separately controlled to float and couple with the power system during stylus writes so as to provide further directional control to the writing tip energy distribution. Within the stylus itself, adjustments to direct current and alternating current voltages may further adjust the writing tip energy distribution. Once a stylus is deployed, updates to operating system drivers and touch controller firmware may be used to further enhance and end user experience relating to stylus accuracy and matching existing stylus and new stylus as hardware is released.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to execute instructions that process information;
a memory disposed in the housing and interfaced with the processor, the memory operable to store the instructions and information;
a touchscreen display disposed in the housing and interfaced with the processor, the touchscreen display operable to present the information as visual images and to detect touches as inputs;
a touch controller interfaced with the touchscreen display and operable to locate touches on the touchscreen display and to transmit wireless signals from the touchscreen display; and
a stylus having a body, the body supporting a writing tip configured to transmit wireless signals, a receive antenna separate from the writing tip and configured to receive wireless signals, a processing resource interfaced with the writing tip and the receive antenna, and a power source operable to power the processing resource; and
a non-transient memory disposed in the stylus body and interfaced with the processing resource, the non-transient memory storing instructions that when executed on the processing resource cause:
the receive antenna to float relative to the power source when the receive antenna receives wireless signals transmitted from the touchscreen display, the float relative to the power source comprising decoupling from the power source; and
the receive antenna to couple relative to the power source when the writing tip transmits wireless signals to the touchscreen display.

2. The information handling system of claim 1 further comprising:
a capacitor disposed between the processing resource and the receive antenna;
a direct current voltage source interfaced with the power source and coupled between the capacitor and the receive antenna; and
instructions stored in the non-transitory memory that when executed on the processing resource apply a direct current voltage at the receive antenna to achieve a desired wireless signal transmit distribution at the writing tip.

3. The information handling system of claim 2 wherein the touch controller communicates by wireless signals a selectable direct current to apply to the receive antenna during transmits of wireless signals from the writing tip.

4. The information handling system of claim 1 further comprising non-transient memory disposed in the housing and storing instructions that when executed cause the touch controller to detect plural styluses interacting with the touchscreen display and to command at least one of the plural styluses to couple the receive antenna to the power source to achieve a desired wireless signal transmit distribution at the writing tip.

5. The information handling system of claim 4 wherein the instructions include calibration of the type of coupling of the receive antenna to the power source to achieve the desired wireless signal transmit distribution.

6. The information handling system of claim 5 wherein the desired wireless signal transmit distribution comprises substantially a match of the wireless signal transmit distribution across the plural styluses.

7. The information handling system of claim 1 wherein the stylus processing resource couples the receive antenna relative to the power source by applying an alternating current at the receive antenna.

8. The information handling system of claim 1 wherein the stylus processing resource couples the receive antenna relative to the power source by applying a selectable direct current voltage at the receive antenna.

9. The information handling system of claim 5 wherein the stylus processing resource couples the receive antenna relative to the power source by applying one or more of direct current voltage, alternating current voltage and ground.

* * * * *